US012762819B2

(12) United States Patent
Sekiguchi et al.

(10) Patent No.: US 12,762,819 B2
(45) Date of Patent: Oct. 13, 2026

(54) DETECTION DEVICE

(71) Applicant: Japan Display Inc., Tokyo (JP)

(72) Inventors: Yoshihiro Sekiguchi, Tokyo (JP); Akihiko Fujisawa, Tokyo (JP); Kaoru Ito, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 19/233,549

(22) Filed: Jun. 10, 2025

(65) Prior Publication Data

US 2025/0384646 A1 Dec. 18, 2025

(30) Foreign Application Priority Data

Jun. 12, 2024 (JP) ................................ 2024-095193

(51) Int. Cl.

| | |
|---|---|
| ***H04N 25/703*** | (2023.01) |
| ***G06V 10/141*** | (2022.01) |
| ***G06V 10/147*** | (2022.01) |
| ***G06V 20/69*** | (2022.01) |

(52) U.S. Cl.

CPC .......... *G06V 10/141* (2022.01); *G06V 10/147* (2022.01); *G06V 20/693* (2022.01); *H04N 25/703* (2023.01)

(58) Field of Classification Search

CPC .. H04N 25/703; G06V 10/141; G06V 10/147; G06V 20/693

USPC ........................................................... 348/79

See application file for complete search history.

(56) References Cited

U.S. PATENT DOCUMENTS

| | | | | |
|---|---|---|---|---|
| 8,896,545 | B2 * | 11/2014 | Powell | G06F 3/0412 345/173 |
| 9,367,751 | B2 * | 6/2016 | Honda | G08G 1/166 |
| 10,796,128 | B2 * | 10/2020 | Fomani | G06V 40/1318 |
| 11,915,096 | B2 * | 2/2024 | Kato | G06V 40/1318 |
| 11,921,205 | B2 * | 3/2024 | Wang | G01S 17/04 |
| 2011/0273188 | A1 * | 11/2011 | Aubry | H03K 17/955 324/649 |
| 2018/0012069 | A1 * | 1/2018 | Chung | G06V 40/1329 |

FOREIGN PATENT DOCUMENTS

| | | |
|---|---|---|
| JP | 2018-033430 A | 3/2018 |

* cited by examiner

*Primary Examiner* — Trang U Tran
(74) *Attorney, Agent, or Firm* — K&L Gates LLP

(57) ABSTRACT

According to an aspect, a detection device includes: an optical sensor having a detection area in which sensor pixels are arranged; a light source in which light-emitting diodes are arranged; and a control circuit configured to control the optical sensor and the light source, acquire detection values of the sensor pixels, and generate an image of an object to be detected placed in the detection area. Each sensor pixel is associated with a nearest light-emitting diode of the light-emitting diodes. The control circuit is configured to acquire detection values of the sensor pixels when the object to be detected is not placed in the detection area, and uniformly set current set values of the light-emitting diodes so that an average value of the detection values of the sensor pixels associated with the light-emitting diodes that are not failed falls within a target range.

5 Claims, 14 Drawing Sheets

FIG.6

| PHOTODIODE PD(m, n) | PARTIAL AREA PAA(p, q) | LIGHT-EMITTING DIODE LED(p, q) |
|---|---|---|
| PD(1, 1) TO PD(4, 4) | PAA(1, 1) | LED(1, 1) |
| PD(5, 1) TO PD(8, 4) | PAA(2, 1) | LED(2, 1) |
| PD(9, 1) TO PD(12, 4) | PAA(3, 1) | LED(3, 1) |
| PD(13, 1) TO PD(16, 4) | PAA(4, 1) | LED(4, 1) |
| PD(1, 5) TO PD(4, 8) | PAA(1, 2) | LED(1, 2) |
| PD(5, 5) TO PD(8, 8) | PAA(2, 2) | LED(2, 2) |
| PD(9, 5) TO PD(12, 8) | PAA(3, 2) | LED(3, 2) |
| PD(13, 5) TO PD(16, 8) | PAA(4, 2) | LED(4, 2) |
| PD(1, 9) TO PD(4, 12) | PAA(1, 3) | LED(1, 3) |
| PD(5, 9) TO PD(8, 12) | PAA(2, 3) | LED(2, 3) |
| PD(9, 9) TO PD(12, 12) | PAA(3, 3) | LED(3, 3) |
| PD(13, 9) TO PD(16, 12) | PAA(4, 3) | LED(4, 3) |
| PD(1, 13) TO PD(4, 16) | PAA(1, 4) | LED(1, 4) |
| PD(5, 13) TO PD(8, 16) | PAA(2, 4) | LED(2, 4) |
| PD(9, 13) TO PD(12, 16) | PAA(3, 4) | LED(3, 4) |
| PD(13, 13) TO PD(16, 16) | PAA(4, 4) | LED(4, 4) |

DETECTION DEVICE

CROSS-REFERENCE TO RELATED APPLICATION

This application claims the benefit of priority from Japanese Patent Application No. 2024-095193 filed on Jun. 12, 2024, the entire contents of which are incorporated herein by reference.

BACKGROUND

1. Technical Field

What is disclosed herein relates to a detection device.

2. Description of the Related Art

Japanese Patent Application Laid-open Publication No. 2018-033430 (JP-A-2018-033430) discloses a method for acquiring images over time of a culture medium in a culture vessel and a colony of microorganisms such as bacteria (object to be detected) on the culture medium with a lens-less imaging system using a photosensor. In a lens-less imaging system of JP-A-2018-033430, light emitted from a light source passes through a colony of microorganisms (object to be detected) and enters a photosensor. The photosensor acquires colony formation images (scattered light patterns) of the microorganisms as pixel data. In such a lens-less imaging system, to acquire a growth process over time of the colony of the microorganisms, the amount of light of a light-emitting element is adjusted so that a detection value acquired in the absence of the object to be detected falls within a predetermined range.

In such a lens-less imaging system, to maintain a uniform in-plane luminance distribution in a detection area, a configuration may be employed in which a plurality of light-emitting diodes (LEDs) are arranged so as to face the detection area. In such a configuration, if some of the LEDs fail, the detection value of a detection element located directly below or near a normal LED may deviate from a target value.

For the foregoing reasons, there is a need for a detection device having a configuration in which a plurality of LEDs are arranged so as to face a detection area and capable of reducing the occurrence of an abnormal detection value of a detection element located directly below or near a normal LED due to a failure of another LED.

SUMMARY

According to an aspect, a detection device includes: an optical sensor having a detection area in which a plurality of sensor pixels are arranged in a planar configuration; a light source in which a plurality of light-emitting diodes are arranged in a plane parallel to the detection area; and a control circuit configured to control the optical sensor and the light source, acquire detection values of the sensor pixels, and generate an image of an object to be detected placed in the detection area. Each of the sensor pixels is associated with a nearest light-emitting diode of the light-emitting diodes. The control circuit is configured to acquire detection values of the sensor pixels when the object to be detected is not placed in the detection area, and uniformly set current set values of the light-emitting diodes so that an average value of the detection values of the sensor pixels associated with the light-emitting diodes that are not failed falls within a target range.

BRIEF DESCRIPTION OF THE DRAWINGS

FIG. 6 is a conceptual chart illustrating an exemplary correspondence relation between photodiodes and light-emitting diodes;

DETAILED DESCRIPTION

Figure 1:
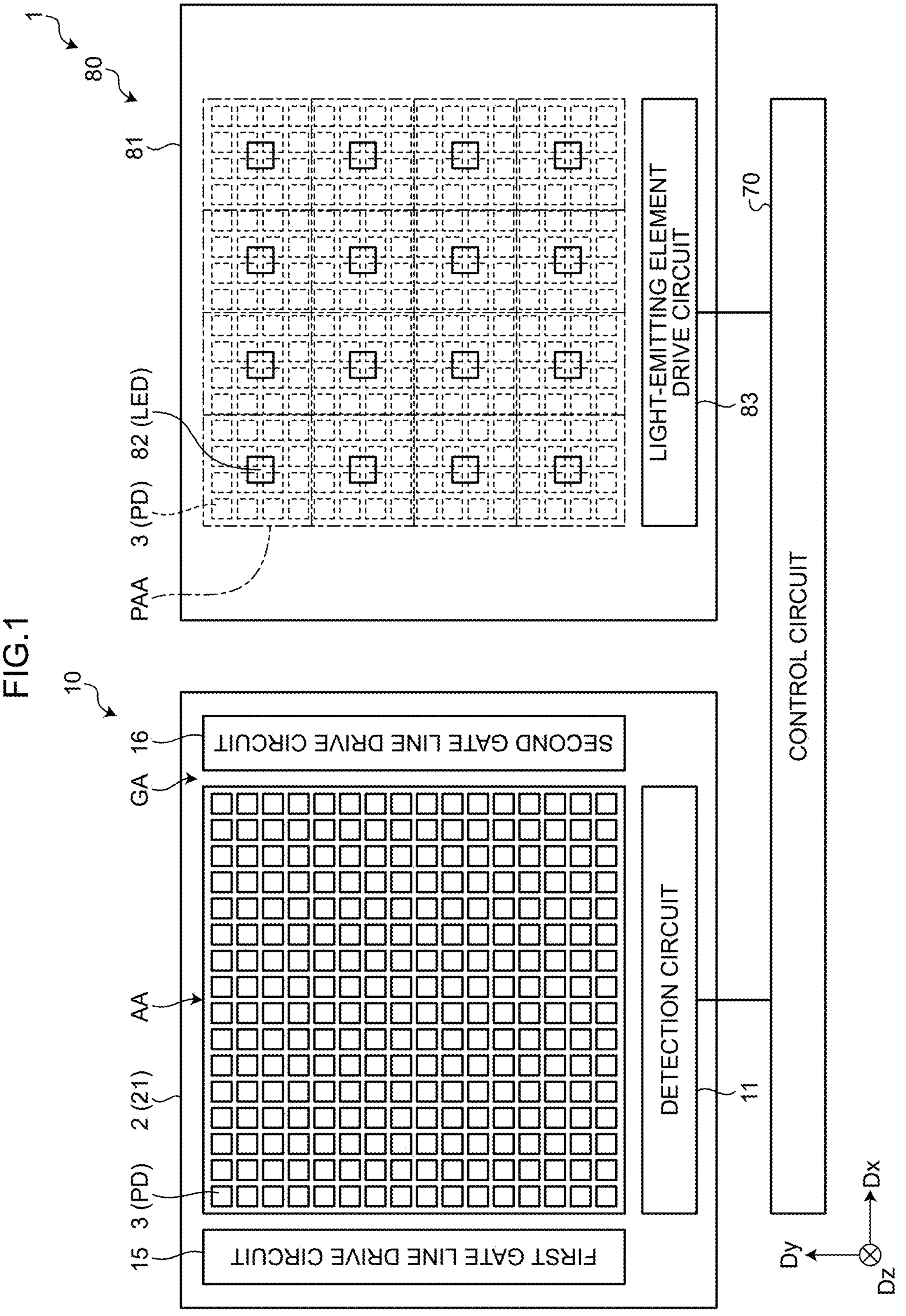
FIG. 1 is a schematic configuration diagram illustrating an exemplary block configuration of a detection device according to an embodiment of the present disclosure.

The following describes a mode (embodiment) for carrying out the present disclosure in detail with reference to the drawings. The present disclosure is not limited to the description of the embodiment given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In the present disclosure, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

Figure 2:
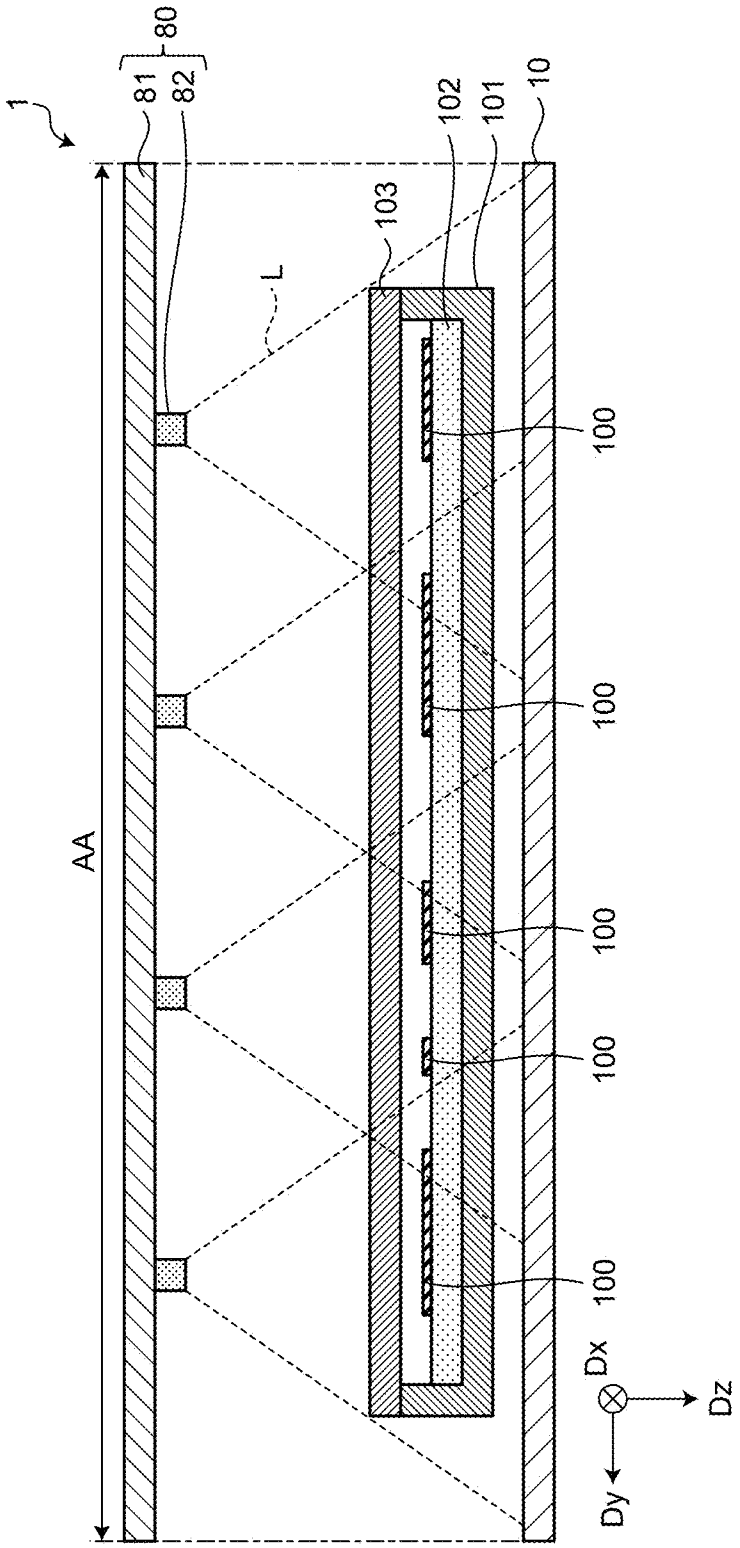
FIG. 2 is a sectional view schematically illustrating the detection device according to the embodiment.

FIG. 1 is a schematic configuration diagram illustrating an exemplary block configuration of a detection device according to an embodiment of the present disclosure. FIG. 2 is a sectional view schematically illustrating the detection device according to the embodiment. In the present disclosure, a detection device 1 is what is called a biosensor that detects micro-objects such as bacteria as objects to be detected 100. The detection device 1 includes an optical sensor 10, a control circuit 70, and a light source 80.

The optical sensor 10 is provided with a plurality of sensor pixels 3 on an array substrate 2 formed using a substrate 21 as a base. A detection area AA is an area in which the sensor pixels 3 are arranged in a planar configuration on the array substrate 2.

A first direction Dx is one direction in a plane parallel to the substrate 21. A second direction Dy is one direction in the plane parallel to the substrate 21 and is a direction orthogonal to the first direction Dx. A third direction Dz is a direction orthogonal to the first direction Dx and the second direction Dy and is a direction normal to a principal surface of the substrate 21.

Specifically, in the detection area AA, the sensor pixels 3 are arrayed in the first direction Dx and the second direction Dy, thus being arranged in a matrix having a row-column configuration. The sensor pixels 3 are not limited to being arranged in this manner and may be arranged in a staggered manner in the detection area AA.

Each of the sensor pixels 3 includes a photodiode PD. The photodiode PD outputs a potential corresponding to light emitted thereto. More specifically, the photodiode PD is an organic photodiode (OPD) using an organic semiconductor or a positive-intrinsic-negative (PIN) photodiode.

In the light source 80, a plurality of light-emitting elements 82 are provided on a light source board 81 that is provided so as to face the array substrate 2 of the optical sensor 10 in the third direction Dz. The light source 80 also includes a light-emitting element drive circuit 83 that drives the light-emitting elements 82 mounted on the light source board 81. Each of the light-emitting elements 82 is configured as a light-emitting diode (LED), for example.

As illustrated in FIG. 1, in the light source 80, the light-emitting elements 82 (light-emitting diodes LED) are arranged in a plane parallel to the detection area AA of the optical sensor 10.

Specifically, in the light source 80, the light-emitting elements 82 (light-emitting diodes LED) are arrayed in the first direction Dx and the second direction Dy, thus being arranged in a matrix having a row-column configuration, in an area facing the detection area AA of the optical sensor 10. The light-emitting elements 82 (light-emitting diodes LED) are not limited to being arranged in this manner and may be arranged in a staggered manner in the detection area AA of the optical sensor 10.

More specifically, the detection area AA is divided into a plurality of partial areas PAA, as illustrated in FIG. 1, and the light-emitting elements 82 (light-emitting diodes LED) are provided correspondingly to the respective partial areas PAA. An area facing a peripheral area GA outside the detection area AA of the optical sensor 10 is provided therein with the light-emitting element drive circuit 83 to drive the light-emitting elements 82 (light-emitting diodes LED) provided correspondingly to the partial areas PAA.

FIG. 1 illustrates a configuration in which the detection area AA having 16 sensor pixels 3 (photodiodes PD) arranged in the first and the second directions Dx and Dy is divided into four quarters in each of the first and the second directions Dx and Dy, thus providing 16 divided areas PAA.

In the example illustrated in FIG. 1, four sensor pixels 3 (photodiodes PD) are arranged in each of the first and the second directions Dx and Dy in each of the partial areas PAA. The light source 80 is provided with the light-emitting elements 82 (light-emitting diodes LED) at positions corresponding to the centers of the respective partial areas PAA, when the detection area AA is viewed in the third direction Dz. In other words, each of the sensor pixels 3 (photodiodes PD) is associated with the nearest light-emitting element 82 (light-emitting diode LED) when the detection area AA is viewed in plan view. Thus, one light-emitting element 82 (light-emitting diode LED) is associated with more than one of the sensor pixels 3 (photodiodes PD).

In the present disclosure, the detection device 1 includes a placement board 101 on which the objects to be detected 100 is placed, and a cover member 103. The placement board 101 and the cover member 103 are light-transmitting plate-like members formed of glass, for example. Specifically, the placement board 101 and the cover member 103 are a Petri dish, for example.

The objects to be detected 100 are cultured on a culture medium 102 (e.g., agar) provided on the placement board 101. The placement board 101 is covered with the cover member 103, and the objects to be detected 100 are placed between the optical sensor 10 and the light source 80. More specifically, in the detection device 1, the placement board 101 and the cover member 103 (objects to be detected 100), and the light source 80 are arranged in this order above the optical sensor 10.

Light L emitted from the light-emitting elements 82 passes through the placement board 101, the culture medium 102, and the cover member 103, and then reaches the detection area AA. The intensity of light received by the sensor pixels 3 (hereinafter also referred to as "received light intensity") differs between areas overlapping the objects to be detected 100 and areas not overlapping the objects to be detected 100. The optical sensor 10 can capture an image of a colony (objects to be detected 100) on the culture medium 102 by differences in the received light intensity that differs between the sensor pixels 3.

The peripheral area GA outside the detection area AA of the substrate 21 is provided with a first gate line drive circuit 15 and a second gate line drive circuit 16.

Figure 3:
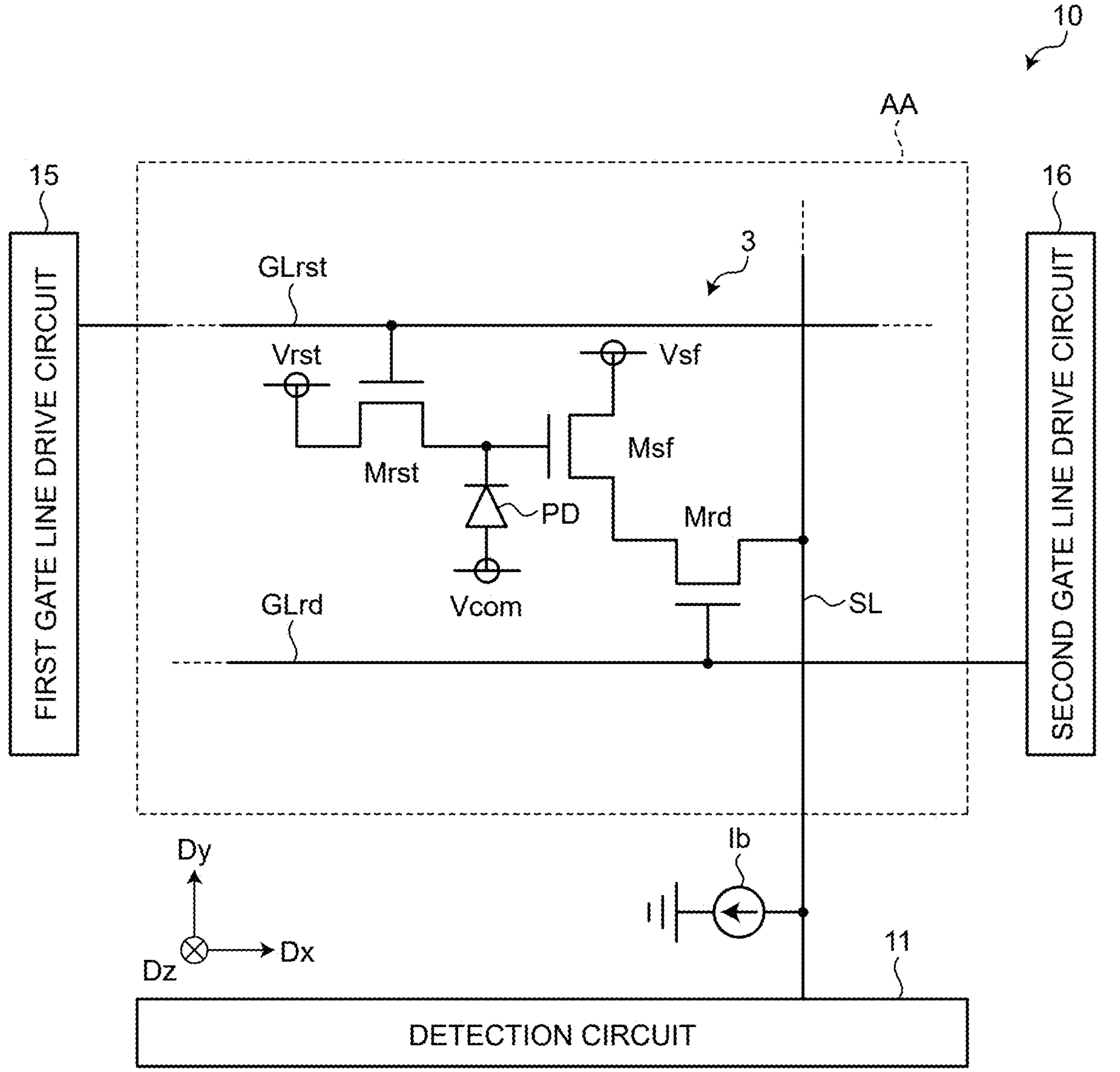
FIG. 3 is a circuit diagram illustrating an optical sensor of the detection device according to the embodiment.

The first and the second gate line drive circuits 15 and 16 are arranged with the detection area AA interposed therebetween in the first direction Dx. The first and the second gate line drive circuits 15 and 16 are not limited to being arranged in this way. Specifically, the first and the second gate line drive circuits 15 and 16 may be configured, for example, as one gate line drive circuit. FIG. 3 is a circuit diagram illustrating the optical sensor according to the embodiment. As illustrated in FIG. 3, the sensor pixel 3 includes the photodiode PD, a reset transistor Mrst, a readout transistor Mrd, and a source follower transistor Msf. The sensor pixel 3 is also provided with a reset control scan line GLrst, a readout control scan line GLrd, and a signal line SL.

The reset control scan line GLrst, the readout control scan line GLrd, and the signal line SL are each coupled to the sensor pixels 3 in the detection area AA. Specifically, the reset control scan line GLrst and the readout control scan line GLrd extend in the first direction Dx and are coupled to the sensor pixels 3 arranged in the first direction Dx. The signal line SL extends in the second direction Dy and is coupled to the sensor pixels 3 arranged in the second direction Dy. The signal line SL is a wiring line through which signals from a plurality of transistors (readout transistor Mrd and source follower transistor Msf) are output.

The reset transistor Mrst, the readout transistor Mrd, and the source follower transistor Msf are provided correspondingly to one photodiode PD. The transistors included in the sensor pixel 3 are each configured as an n-type thin-film transistor (TFT). However, each of the transistors is not limited thereto and may be configured as a p-type TFT.

A reference potential Vcom is applied to the anode of the photodiode PD. The cathode of the photodiode PD is coupled to one of the source and the drain of the reset transistor Mrst and the gate of the source follower transistor Msf.

The gate of the reset transistor Mrst is coupled to the reset control scan line GLrst. The other of the source and the drain of the reset transistor Mrst is supplied with a reset potential Vrst. Turning on the reset transistor Mrst (into a conducting state) resets the potential of the cathode of the photodiode PD to the reset potential Vrst. The reference potential Vcom is lower than the reset potential Vrst, and the photodiode PD is driven in a reverse-biased manner.

The source follower transistor Msf is coupled between a terminal supplied with a power supply potential Vsf and the readout transistor Mrd. The gate of the source follower transistor Msf is coupled to the cathode of the photodiode PD. The gate of the source follower transistor Msf is supplied with a voltage corresponding to the received light intensity of the photodiode PD. As a result, the source follower transistor Msf outputs a potential corresponding to the received light intensity of the photodiode PD to the readout transistor Mrd.

The readout transistor Mrd is coupled between the source of the source follower transistor Msf and the signal line SL. The gate of the readout transistor Mrd is coupled to the readout control scan line GLrd. When the read transistor Mrd is turned on, the signal output from the source follower transistor Msf, that is, the potential corresponding to the received light intensity of the photodiode PD, is output to the output signal line SL.

In FIG. 3, the reset transistor Mrst and the readout transistor Mrd each have a single-gate structure. However, the reset transistor Mrst and the readout transistor Mrd may each have what is called a double-gate structure configured by coupling two transistors in series, or may have a configuration in which three or more transistors are coupled in series. The circuit of one sensor pixel 3 is not limited to the configuration including the three transistors of the reset transistor Mrst, the source follower transistor Msf, and the readout transistor Mrd. The sensor pixel 3 may include two transistors or four or more transistors.

The first gate line drive circuit 15 is a circuit that drives a plurality of the reset control scan lines GLrst in the detection area AA. The first gate line drive circuit 15 is a shift register circuit, for example.

In the present disclosure, the first gate line drive circuit 15 sequentially selects the reset control scan lines GLrst based on various control signals such as start pulse signals and clock pulse signals supplied from a detection circuit 11, and supplies reset control signals to the selected reset control scan lines GLrst. In other words, the first gate line drive circuit 15 simultaneously supplies the reset control signals to the sensor pixels 3 arranged in the first direction Dx, and sequentially supplies the reset control signals to the sensor pixels 3 arranged in the second direction Dy. This operation resets the potentials of the photodiodes PD of the sensor pixels 3 coupled to the reset control scan lines GLrst selected by the first gate line drive circuit 15 for the sensor pixels 3.

The second gate line drive circuit 16 is a circuit that drives a plurality of the readout control scan lines GLrd in the detection area AA. The second gate line drive circuit 16 is a shift register circuit, for example.

In the present disclosure, the second gate line drive circuit 16 sequentially selects the readout control scan lines GLrd based on the various control signals such as the start pulse signals and the clock pulse signals supplied from the detection circuit 11, and supplies readout control signals to the selected readout control scan lines GLrd. In other words, the second gate line drive circuit 16 simultaneously supplies the readout control signals to the sensor pixels 3 arranged in the first direction Dx, and sequentially supplies the readout control signals to the sensor pixels 3 arranged in the second direction Dy. This operation reads the potentials of the sensor pixels 3 coupled to the readout control scan lines GLrd selected by the second gate line drive circuit 16.

The detection circuit 11 is, for example, a readout integrated circuit (ROIC) that includes an analog front-end (AFE) circuit.

The detection circuit 11 is coupled to a constant current source 43 to apply a bias current Ib to the readout transistor Mrd. This constant current source 43 may be provided in the detection circuit 11 or in the substrate 21.

The detection circuit 11 converts the output potential of each of the sensor pixels 3 into a digital signal and outputs the digital signal as a detection value Raw of each of the sensor pixels 3 to the control circuit 70. More specifically, the detection circuit 11 converts the analog difference value between the output potential of the sensor pixel 3 in a reset period and the output potential of the sensor pixel 3 in a readout period into a digital value to generate the detection value Raw of each of the sensor pixels 3.

Figure 4:
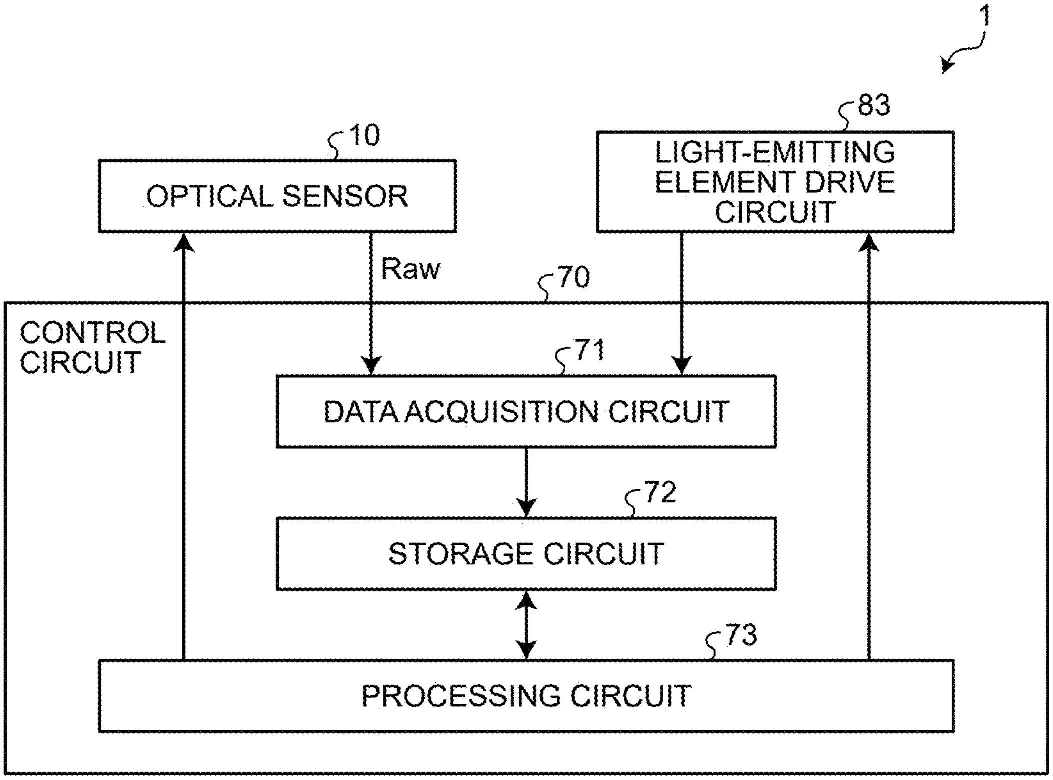
FIG. 4 is a block diagram illustrating a configuration example of a control circuit according to the embodiment.

FIG. 4 is a block diagram illustrating a configuration example of the control circuit according to the embodiment. The control circuit 70 synchronously controls a detection operation in the optical sensor 10 and a lighting operation in the light source 80. The control circuit 70 includes, for example, a micro-controller unit (MCU), a random-access memory (RAM), an electrically erasable programmable read-only memory (EEPROM), and a read-only memory (ROM).

Signal transmission among the control circuit 70, the detection circuit 11, and the light source 80 is performed using a clock synchronization type serial interface. More specifically, signal transmission between the control circuit 70 and the detection circuit 11 is performed using Serial Peripheral Interface (SPI), for example. Signal transmission between the control circuit 70 and the light-emitting element drive circuit 83 is performed using Inter-Integrated Circuit (I2C), for example. The present disclosure is not limited by a signal transmission system between the control circuit 70 and both of the optical sensor 10 and the light source 80.

As illustrated in FIG. 4, the control circuit 70 includes a data acquisition circuit 71, a storage circuit 72, and a processing circuit 73.

The data acquisition circuit 71 acquires the detection value Raw of each sensor pixel 3 from the detection circuit 11 and stores the acquired value in the storage circuit 72.

The processing circuit 73, for example, binarizes the detection value Raw for each sensor pixel 3 stored in the storage circuit 72 and generates a colony formation image that is on the culture medium 102. The processing to generate the colony formation image that is on the culture medium 102 is not limited to the binarization processing.

As described above, each of the sensor pixels 3 (photodiodes PD) is associated with the nearest light-emitting element 82 (light-emitting diode LED) when the detection area AA is viewed in plan view. In the present disclosure, the control circuit 70 has a function to make the initial setting of a light emission current ICS. The light emission current ICS is current that flows to the light-emitting element 82 (light-emitting diode LED). The control circuit 70 makes the initial setting such that the detection value Raw of the sensor pixel 3 associated with the light-emitting element 82 (light-emitting diode LED) that is not failed falls within a target range (for example, "200"±5% in the case of an 8-bit digital value) in the absence of the objects to be detected 100 in the detection area AA. Specifically, the data acquisition circuit 71 acquires a failure detection flag BD for the light-emitting element 82 (light-emitting diode LED) from the light-emitting element drive circuit 83 and stores the flag in the storage circuit 72. At start-up of the detection device 1, the processing circuit 73 sets the light emission current ICS that flows to the light-emitting element 82 (light-emitting diode LED) based on the failure detection flag BD stored in the storage circuit 72. The failure detection flag BD for the light-emitting element 82 (light-emitting diode LED) and the initial setting process of the detection device 1 will be described later.

Figure 5:
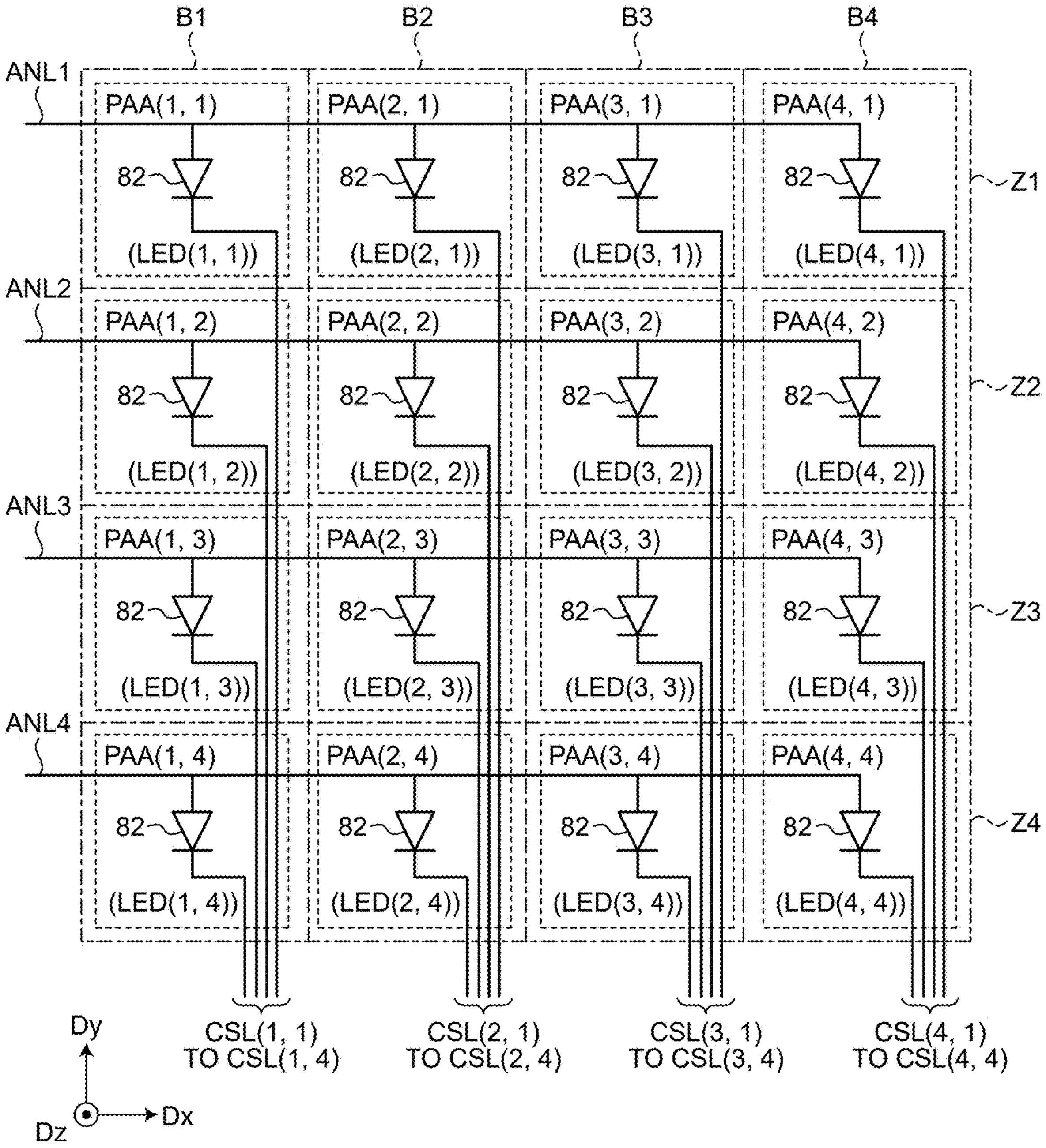
FIG. 5 is a plan view illustrating a correspondence relation between partial areas and light-emitting elements of the detection device according to the embodiment.

FIG. 5 is a plan view illustrating a correspondence relation between the partial areas and the light-emitting elements of the detection device according to the embodiment. FIG. 5 illustrates the configuration in which the detection area AA having 16 sensor pixels 3 (photodiodes PD) arranged in the first and the second directions Dx and Dy is divided into four in each of the first and the second directions Dx and Dy, thus providing 16 divided areas PAA, as illustrated in FIG. 1.

In other words, each of the partial areas PAA is an area where a pth block Bp overlaps a qth zone Zq. The pth block Bp is a block obtained by dividing the detection area AA into four blocks in the first direction Dx (where p is a natural number from 1 to P, and P is the total number of the partial areas PAA arranged in the first direction Dx). The qth zone Zq is a zone obtained by dividing the detection area AA into four zones in the second direction Dy (where q is a natural number from 1 to Q, and Q is the total number of the partial areas PAA arranged in the second direction Dy). Each of the partial detection areas PAA is provided with one light-emitting element 82 (light-emitting diode LED).

A total number M of the sensor pixels 3 (photodiodes PD) arranged in the first direction Dx is not limited to 16. A total number N of the sensor pixels 3 (photodiodes PD) arranged in the second direction Dy is not limited to 16. The total number of the light-emitting elements 82 arranged in the first direction Dx, in other words, a total number P of the partial areas PAA arranged in the first direction Dx (total number in pth block Bp), is not limited to four. The total number of the light-emitting elements 82 arranged in the second direction Dy, in other words, a total number Q of the partial areas PAA arranged in the second direction Dy (total number of qth zone Zq), is not limited to four. Moreover, the number of divisions of the detection area AA, in other words, the total number of partial areas PAA (P×Q), is not limited to 16.

Furthermore, the number of the sensor pixels 3 (photodiodes PD) included in each of the partial areas PAA is not limited to being the same as one another.

Hereinafter, the sensor pixel 3 (photodiode PD) is also referred to as a "photodiode PD(m, n)". The detection value Raw of each photodiode PD(m, n) is also referred to as a "detection value Raw(m, n)".

The partial area PAA where the pth block Bp overlaps the qth zone Zq is also referred to as a "partial area PAA(p, q)". The light-emitting element 82 (light-emitting diode LED) corresponding to the partial area PAA(p, q) is also referred to as a "light-emitting diode LED(p, q)".

In the present disclosure, the correspondence relation between the photodiode PD(m, n) and the light-emitting diode LED(p, q) is stored in advance in the storage circuit 72. FIG. 6 is a conceptual chart illustrating an example of the correspondence relation between the photodiodes and the light-emitting diodes.

In the present disclosure, the anode of the light-emitting diode LED(p, q) is coupled to a light emission control scan line ANLq. The Q light emission control scan lines ANLq extend in the first direction Dx and are arranged in the second direction Dy. That is, the anodes of the P light-emitting diode LEDs (p, q) arranged in the first direction Dx are coupled to the same light emission control scan line ANLq.

In the present disclosure, the cathodes of the light-emitting diodes LED(p, q) are each coupled to a light emission current control line CSL(p, q). The P×Q light emission current control lines CSL(p, q) extend in the second direction Dy and are arranged in the first direction Dx. That is, the cathodes of the Q light-emitting elements 82 arranged in the second direction Dy are each coupled to the single light emission current control line CSL(p, q).

The light-emitting element drive circuit 83 sequentially supplies a light-emitting element drive voltage VLED (at 5 V, for example) to the light-emitting diodes LED(p, q) arranged in the second direction Dy via the Q light emission control scan lines ANLq, based on a control signal supplied from the control circuit 70. This operation sequentially drives the light-emitting elements 82 along the second direction Dy. The wiring pattern of the light emission control scan lines ANLq and the light emission current control lines CSL(p, q) is not limited to that illustrated in FIG. 5. The wiring pattern of the light emission control scan lines ANLq and the light emission current control lines CSL(p, q) only needs to allow the light-emitting diodes LED(p, q) arranged in the second direction Dy to be sequentially driven.

Figure 7:
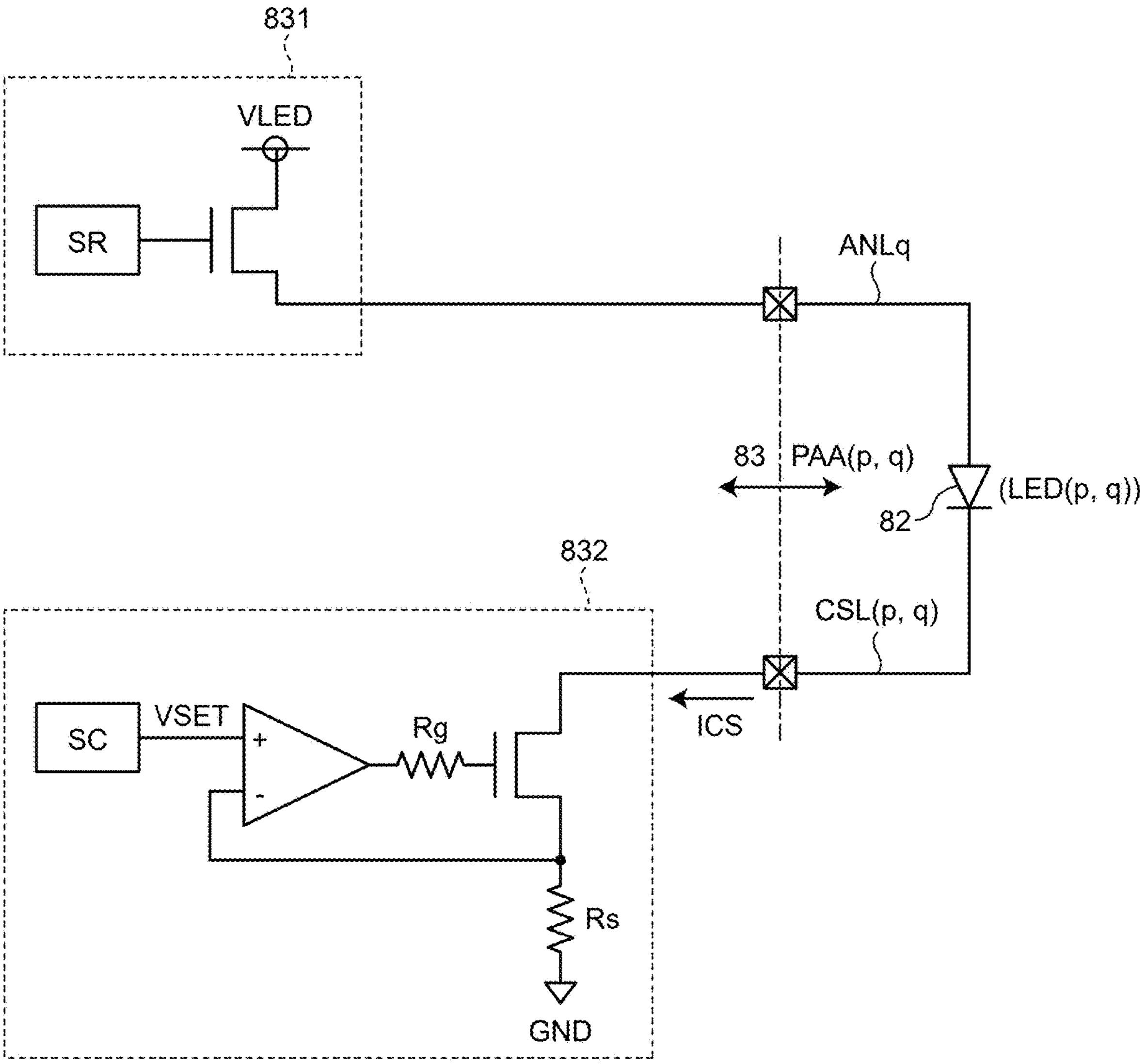
FIG. 7 is a circuit diagram illustrating a configuration example of each of the light-emitting elements and a light-emitting element drive circuit of the detection device according to the embodiment.

FIG. 7 is a circuit diagram illustrating a configuration example of each of the light-emitting elements and the light-emitting element drive circuit of the detection device according to the embodiment. To facilitate description, FIG. 7 illustrates only the configuration of the light-emitting element drive circuit 83 corresponding to one light-emitting diode LED(p, q).

As illustrated in FIG. 7, the light-emitting element drive circuit 83 includes a light emission control scan line drive circuit 831 and a light emission current control circuit 832.

The light emission control scan line drive circuit 831 is a circuit that supplies the light-emitting element drive voltage VLED to the anode of the light-emitting diode LED(p, q).

Specifically, in the light emission control scan line drive circuit 831, the TFT is supplied with a high potential from a shift register circuit SR and is turned on. Then, the output potential of the light emission control scan line drive circuit 831 becomes the light-emitting element drive voltage VLED. This operation supplies the light-emitting element drive voltage VLED to the anode of the light-emitting diode LED(p, q) via the light emission control scan line ANLq.

The light emission current control circuit 832 is a circuit that controls a current (hereinafter also referred to as "light emission current") ICS that flows to the light-emitting diode LED(p, q) supplied with the light-emitting element drive voltage VLED from the light emission control scan line drive circuit 831.

Specifically, the light emission current control circuit 832 includes, for example, a current-drawing constant-current circuit configured by combining an operational amplifier circuit with a TFT. The non-inverting input (+) of the operational amplifier circuit is supplied with a cathode current setting potential VSET set by a cathode current setting circuit SC. This operation sets the light emission current ICS(=VSET/Rs) that flows to the light-emitting diode LED(p, q) through the TFT and a source register Rs.

Figure 8:
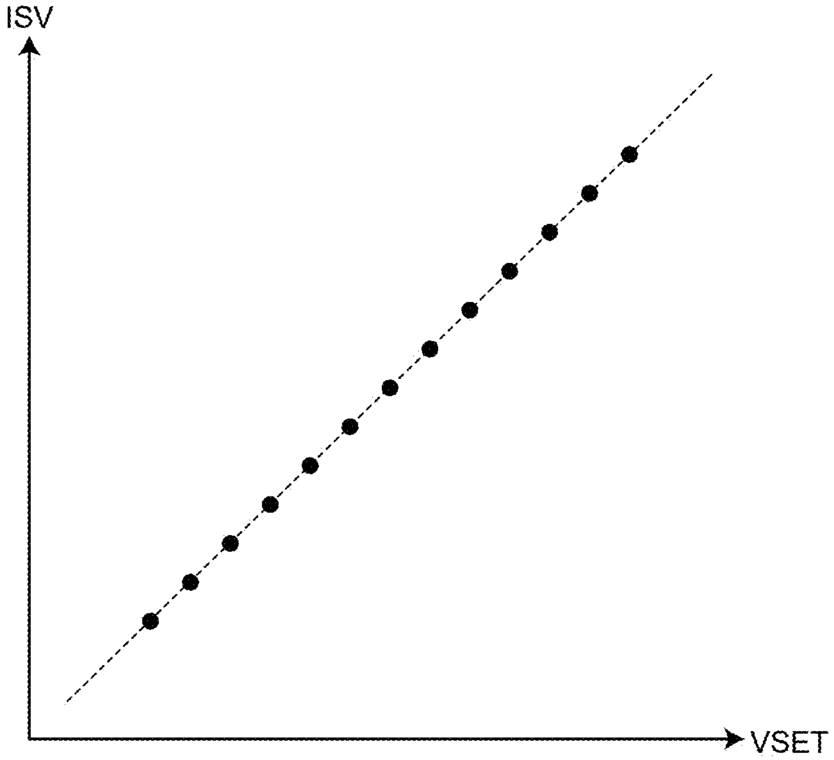
FIG. 8 is a conceptual chart illustrating a relation between a cathode current set value and a cathode current setting potential.

The cathode current setting potential VSET can be set in steps, for example, by selecting a node voltage between a plurality of cathode current adjustment registers coupled in series between the light-emitting element drive voltage VLED (at 5 V, for example) and a ground potential GND. The cathode current setting circuit SC outputs the cathode current setting potential VSET corresponding to a cathode current set value ISV set by the processing circuit 73 of the control circuit 70. FIG. 8 is a conceptual chart illustrating a relation between the cathode current set value and the cathode current setting potential.

Figure 9:
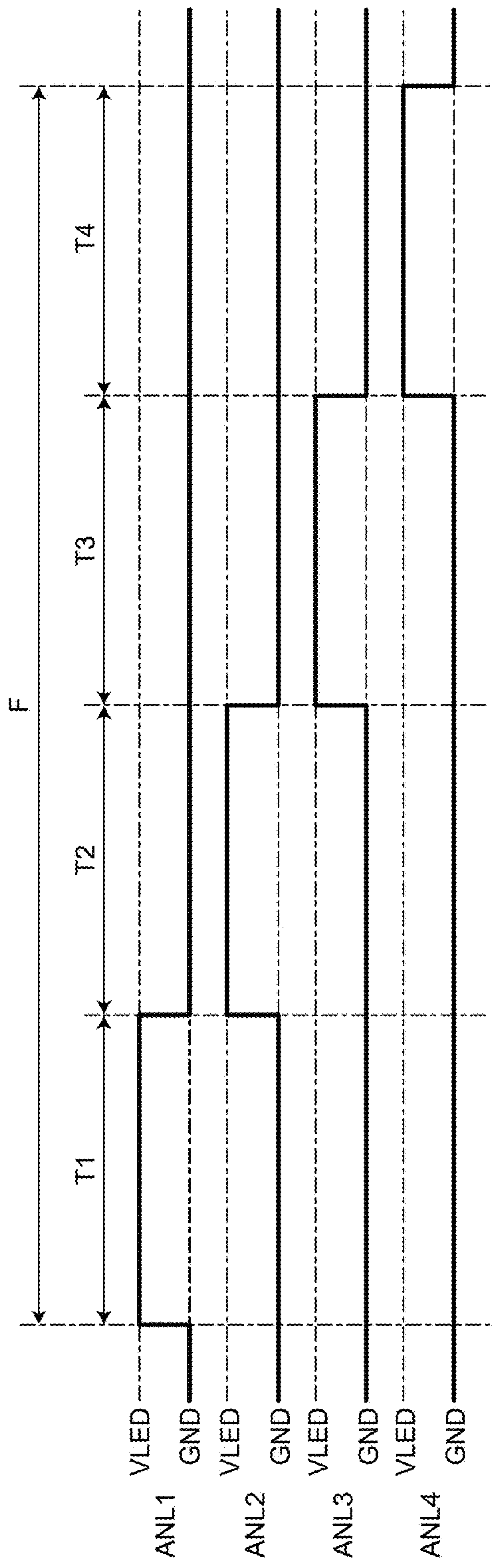
FIG. 9 is a timing waveform diagram illustrating a lighting operation example in the detection device according to the embodiment.

FIG. 9 is a timing waveform diagram illustrating a lighting operation example in the detection device according to the embodiment. In the lighting operation example illustrated in FIG. 9, a qth period Tq is a light emission period of each of the light-emitting diodes LED(p, q) in the qth zone Zq located in the qth row in one frame period F.

The light-emitting element drive circuit 83 supplies the light-emitting element drive voltage VLED to the anode of each of the light-emitting elements 82 in the qth zone Zq via the light emission control scan line ANLq during the qth period Tq. This operation turns on each of the light-emitting elements 82 in the qth zone Zq.

The light-emitting element drive circuit 83 increments the value of q from 1 to Q and repeats the process described above. The optical sensor 10 sequentially acquires the detection value Raw(m, n) of each of the photodiodes PD(m, n) in the qth zone Zq arranged in the second direction Dy during the qth period Tq.

In other words, the light-emitting elements 82 (light-emitting diodes LED) arranged in the second direction Dy are sequentially driven. While performing the sequential driving, the sensor pixels 3 (photodiodes PD) are driven so that, in the drive period (light emission period) of the light-emitting elements 82 arranged in the first direction Dx, the sensor pixels 3 arranged in the second direction Dy in each of the partial areas PAA associated with the light-emitting elements 82 are sequentially driven. This operation acquires the detection values Raw(m, n) for one frame in the detection area AA.

In the configuration of the detection device 1 according to the embodiment described above, if any one or more of the light-emitting diodes LED(p, q) fail and become unlit, the output potentials of the sensor pixels 3 in the partial area PAA(p, q) corresponding to the failed light-emitting diodes LED(p, q) become relatively smaller than the output potentials of the sensor pixels 3 in the partial area PAA(p, q) corresponding to the normal light-emitting diodes LED.

As described above, the light emission current ICS is a current that flows to the light-emitting element 82. In a configuration where the initial setting of the light emission current ICS is made so that the average value of the detection values Raw(m, n) of the entire detection area AA falls within the target range, the output potentials of the sensor pixels 3 in the partial area PAA(p, q) corresponding to the normal light-emitting diodes LED(p, q) become relatively larger due to the failed light-emitting elements 82. As a result, the detection values Raw(m, n) of the photodiodes PD(m, n) in the partial area PAA(p, q) corresponding to the normal light-emitting diodes LED(p, q) may deviate from the target value.

Figure 10:
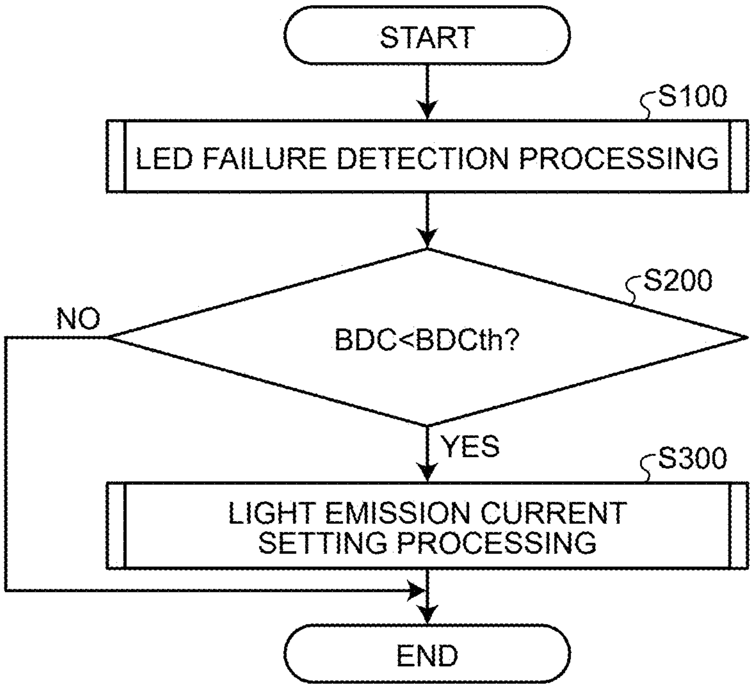
FIG. 10 is a flowchart illustrating an exemplary initial setting process in the detection device according to the embodiment.

The following describes a specific example of the initial setting process in the detection device 1 according to the embodiment. FIG. 10 is a flowchart illustrating an example of the initial setting process in the detection device according to the embodiment. The initial setting process illustrated in FIG. 10 is performed at start-up of the detection device 1. More specifically, the initial setting process of the detection device 1 according to the embodiment is performed when the objects to be detected 100 are not present in the detection area AA.

Figure 11:
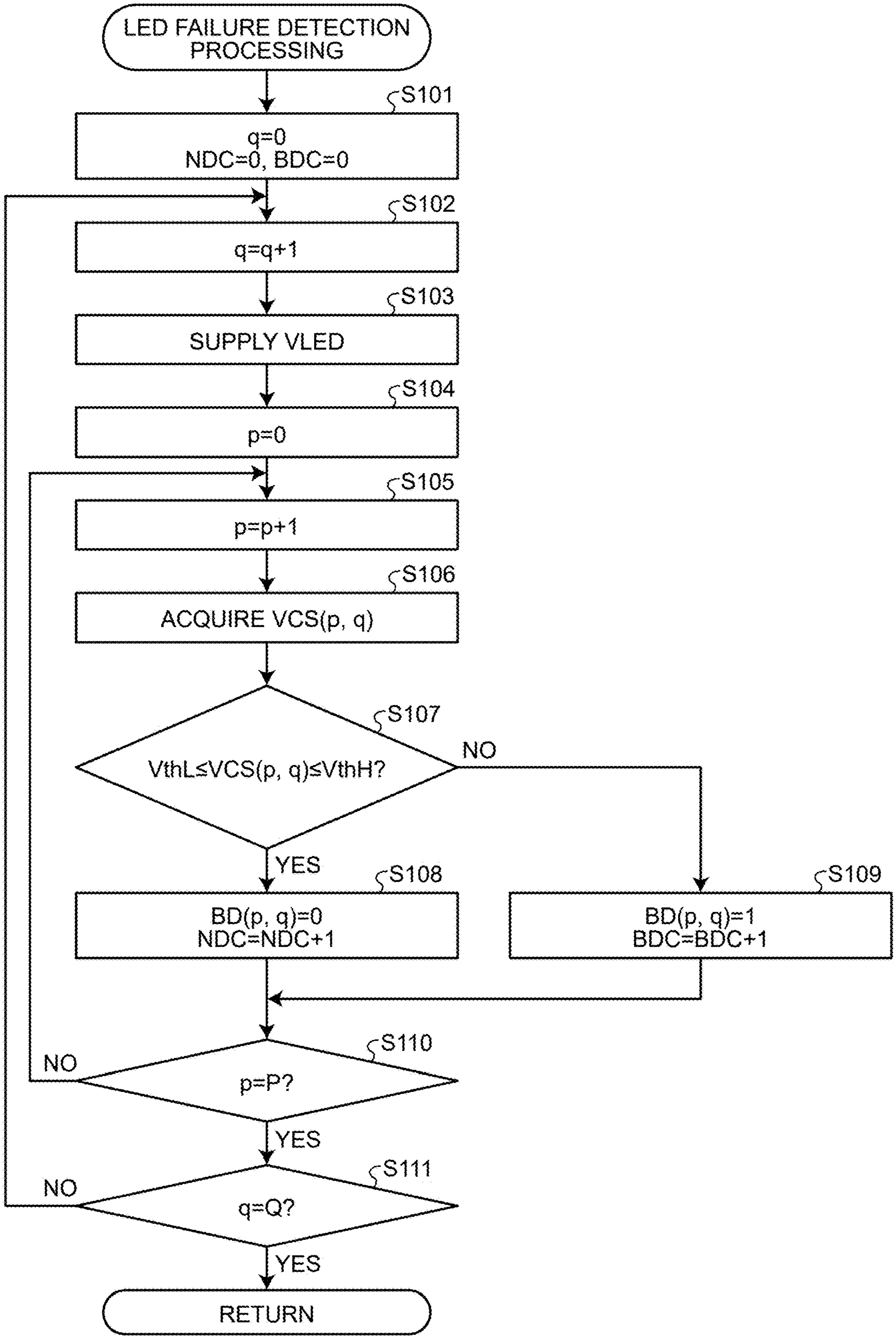
FIG. 11 is a sub-flowchart illustrating an example of a light-emitting diode (LED) failure detection processing.

After the detection device 1 according to the embodiment starts up, first, the control circuit 70 controls the light-emitting element drive circuit 83 to perform a failure determination processing for the light-emitting elements 82 (Step S100) (hereinafter also referred to as "LED failure detection processing"). FIG. 11 is a sub-flowchart illustrating an example of the LED failure detection processing.

In the LED failure detection processing, the light-emitting element drive circuit 83 acquires a cathode voltage VCS(p, q) of each of the light-emitting diodes LED(p, q) when the light-emitting element drive voltage VLED is applied thereto, and performs a threshold determination processing for the acquired cathode voltage VCS(p, q).

Specifically, after the LED failure detection processing illustrated in FIG. 11 starts, the light-emitting element drive circuit 83 resets a zone number q, a normal LED counter NDC, and a failed LED counter BDC (q=0, NDC=0, and BDC=0, Step S101), then, increments the zone number q (q=q+1; Step S102), and supplies the light-emitting element drive voltage VLED to the anodes of the light-emitting diodes LED(p, q) in the qth zone Zq via the light emission control scan line ANLq (Step S103).

The normal LED counter NDC indicates the number of the light-emitting diodes LED(p, q) that are not failed. The failed LED counter BDC indicates the number of the failed light-emitting diodes LED(p, q). In the present disclosure, a threshold BDCth is provided as a threshold for the number of the failed light-emitting diodes LED(p, q) (value of the failed LED counter BDC). When the number of the failed light-emitting diodes LED(p, q) (value of the failed LED counter BDC) is equal to or larger than a predetermined number (threshold BDCth), the initial setting process ends and the detection device 1 is made unusable. In the present disclosure, the threshold BDCth for the failed LED counter BDC is, for example, stored in advance in the storage circuit 72 of the control circuit 70.

Then, the light-emitting element drive circuit 83 resets a block number p (p=0 at Step S104), then, increments the block number p (p=p+1 at Step S105), acquires the cathode voltage VCS(p, q) of the light-emitting diode LED(p, q)

corresponding to the partial area PAA(p, q) (Step S106), and determines whether the acquired cathode voltage VCS(p, q) is within a range from a low-level threshold VthL to a high-level threshold VthH (VthL≤VCS(p, q)≤VthH) (Step S107).

Figure 12A:
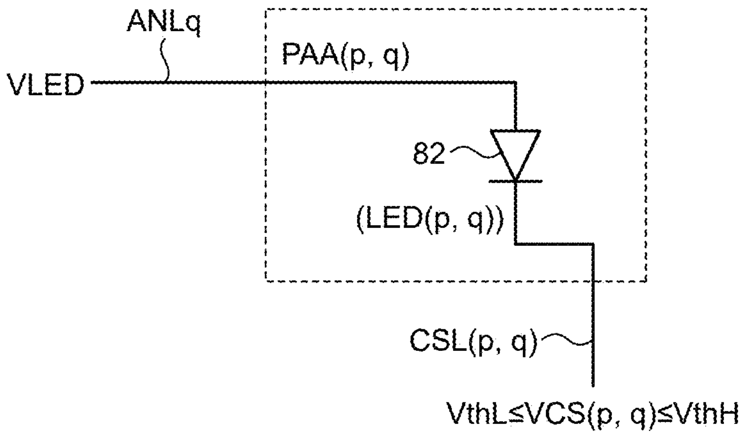
FIG. 12A is a schematic diagram illustrating a specific example of a failure determination processing for the light-emitting element.
Figure 12B:
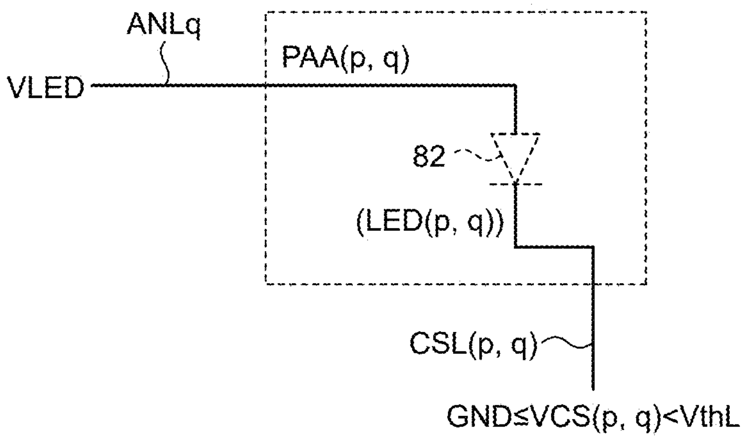
FIG. 12B is a schematic diagram illustrating another specific example of the failure determination processing for the light-emitting element.
Figure 12C:
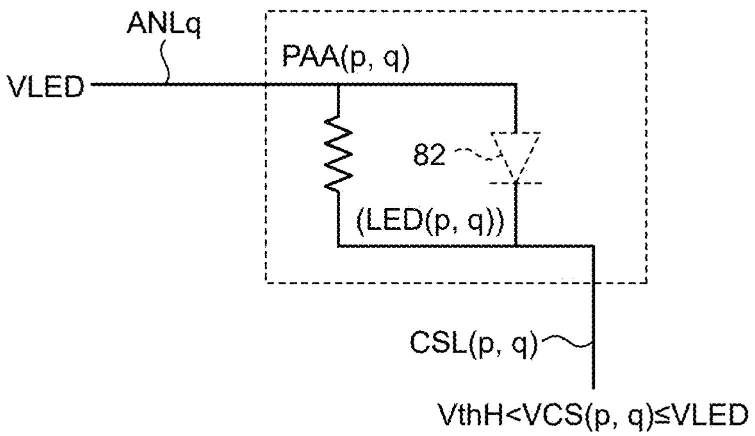
FIG. 12C is a schematic diagram illustrating still another specific example of the failure determination processing for the light-emitting element.

FIGS. 12A, 12B, 12C are schematic diagrams illustrating specific examples of the failure determination processing for the light-emitting element. The low-level threshold VthL is set to 0.25 V, for example. The high-level threshold VthH is set to (VLED−1) V, for example.

If the light-emitting diode LED(p, q) is normal, the cathode voltage VCS(p, q) is within the range from the low-level threshold VthL to the high-level threshold VthH (VthL≤VCS(p, q)≤VthH) as illustrated in FIG. 12A.

If the light-emitting diode LED(p, q) has an open-circuit fault, the cathode of the light-emitting diode LED(p, q) having the open-circuit fault indicated by a dashed line becomes high impedance (HiZ), as illustrated in FIG. 12B. As a result, the cathode voltage VCS(p, q) falls within a range equal to or higher than the potential GND and lower than the low-level threshold VthL (GND≤VCS(p, q)<VthL).

If the light-emitting diode LED(p, q) has a short-circuit fault, the cathode of the light-emitting diode LED(p, q) having the short-circuit fault indicated by a dashed line is brought into a state of layer short-circuited to the light emission control scan line ANLq via low resistance (at 1Ω, for example), as illustrated in FIG. 12C. As a result, the cathode voltage VCS(p, q) falls within a range higher than the high-level threshold VthH and equal to or lower than the light-emitting element drive voltage VLED(VthH<VCS(p, q)≤VLED).

If the acquired cathode voltage VCS(p, q) is within the range from the low-level threshold VthL to the high-level threshold VthH (VthL≤VCS≤VthH) (Yes at Step S107), the light-emitting element drive circuit 83 sets the failure detection flag BD (p, q) for the light-emitting diode LED(p, q) to "0" and increments the normal LED counter NDC (BD (p, q)=0 and NDC=NDC+1 at Step S108). The data acquisition circuit 71 of the control circuit 70 acquires the value of the failure detection flag BD (p, q) for the light-emitting diode LED(p, q) (=0) and the value of the normal LED counter NDC output from the light-emitting element drive circuit 83, and stores them in the storage circuit 72.

If the acquired cathode voltage VCS(p, q) is not within the range from the low-level threshold VthL to the high-level threshold VthH (VthL≤VCS≤VthH) (No at Step S107), in other words, if the acquired cathode voltage VCS(p, q) is within the range equal to or higher than the potential GND and lower than the low-level threshold VthL (GND≤VCS(p, q)<VthL), or the acquired cathode voltage VCS(p, q) is within the range higher than the high-level threshold VthH and equal to or lower than the light-emitting element drive voltage VLED(VthH<VCS(p, q)≤VLED), the light-emitting element drive circuit 83 sets the failure detection flag BD (p, q) for the light-emitting diode LED(p, q) to "1" and increments the failed LED counter BDC (BD (p, q)=1, and BDC=BDC+1 at Step S109). The data acquisition circuit 71 of the control circuit 70 acquires the value of the failure detection flag BD (p, q) for the light-emitting diode LED(p, q) (=1) and the value of the failed LED counter BDC output from the light-emitting element drive circuit 83, and stores them in the storage circuit 72.

The light-emitting element drive circuit 83 then determines whether the block number p is "P" (p=P at Step S110). In other words, the light-emitting element drive circuit 83 determines whether the failure determination processing for all the light-emitting diodes LED(p, q) in the qth zone Zq has been performed. If the failure determination processing for all the light-emitting diodes LED(p, q) in the qth zone Zq has not been performed (No at Step S110), the process starting at Step S105 is repeated.

If the failure determination processing for all the light-emitting diodes LED(p, q) in the qth zone Zq has been performed (Yes at Step S110), the light-emitting element drive circuit 83 subsequently determines whether the zone number q is "Q" (q=Q at Step S111). In other words, the light-emitting element drive circuit 83 determines whether the failure determination processing for all the light-emitting diodes LED(p, q) in the detection area AA has been performed. If the failure determination processing for all the light-emitting diodes LED(p, q) in the detection area AA has not been performed (No at Step S111), the process starting at Step S102 is repeated.

If the failure determination processing for all the light-emitting diodes LED(p, q) in the detection area AA has been performed (Yes at Step S111), the process returns to the initial setting process illustrated in FIG. 10.

After returning to the initial setting process illustrated in FIG. 10, the control circuit 70 determines whether the number of the failed light-emitting diodes LED(p, q) (value of the failed LED counter BDC) is smaller than the predetermined number (threshold BDCth) (Step S200). If the number of the failed light-emitting diodes LED(p, q) (value of the failed LED counter BDC) is equal to or larger than the predetermined number (threshold BDCth) (No at Step S200), the initial setting process ends, and the detection device 1 is made unusable.

Figure 13:
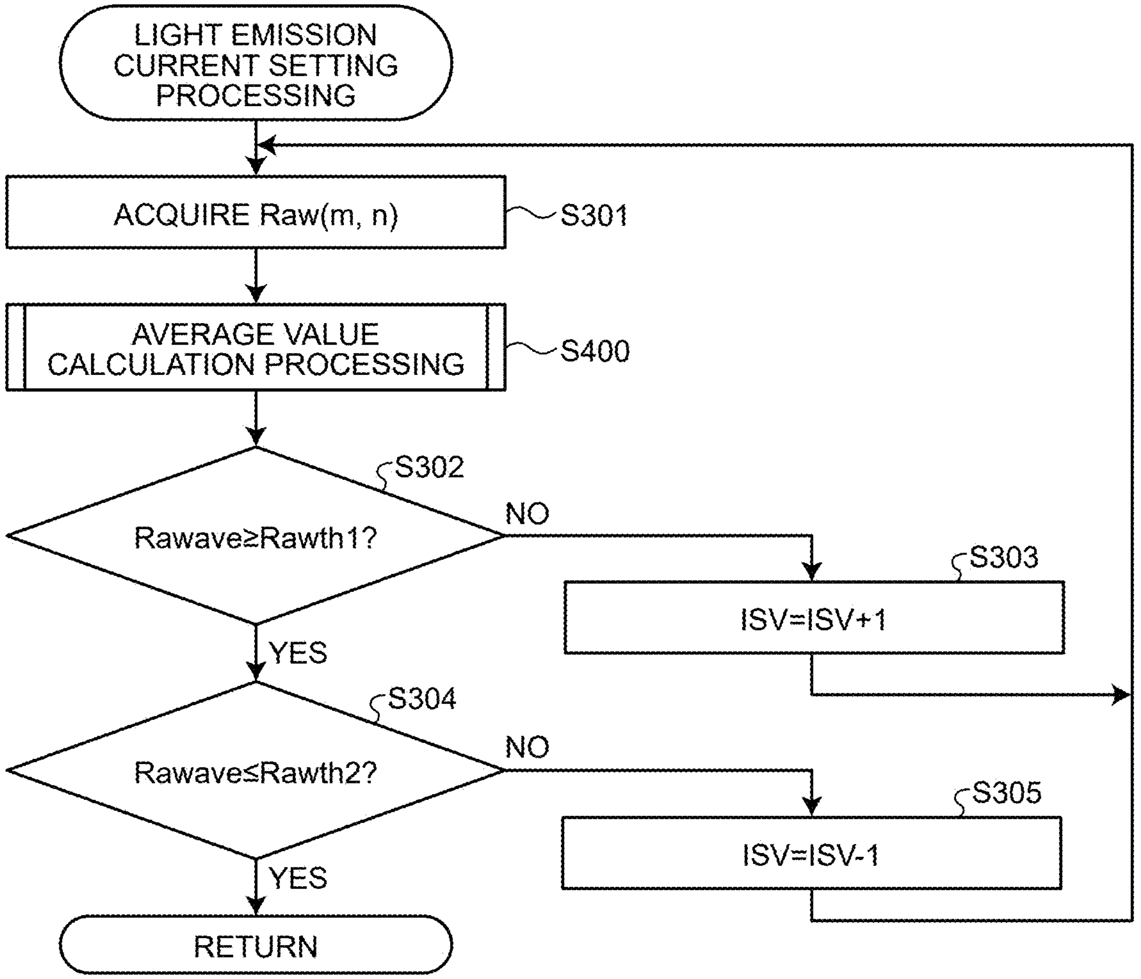
FIG. 13 is a sub-flowchart illustrating an example of a light emission current setting processing.

If the number of the failed light-emitting diodes LED(p, q) (value of the failed LED counter BDC) is smaller than the predetermined number (threshold BDCth) (Yes at Step S200, the control circuit 70 performs a light emission current setting processing (Step S300). FIG. 13 is a sub-flowchart illustrating an example of the light emission current setting processing.

After the light emission current setting processing starts, the control circuit 70 calculates the average value of the detection values Raw(m, n) of the photodiodes PD(m, n) in the partial area PAA(p, q) corresponding to the normal light-emitting diodes LED(p, q), and uniformly sets the cathode current set values ISV so that the calculated average value falls within the target range.

In the present disclosure, the term "target range" refers to a predetermined range with the center value thereof being the target value of the detection value Raw(m, n) of the photodiode PD(m, n) when the objects to be detected 100 are not present in the detection area AA. For example, in the case of an 8-bit digital value, the target value is "200" and the predetermined range is "200"±5%. The lower limit value (hereinafter also referred to as a "target lower limit value") Rawth1 and the upper limit value (hereinafter also referred to as a "target upper limit value") Rawth2 are, for example, stored in advance in the storage circuit 72 of the control circuit 70.

Figure 14:
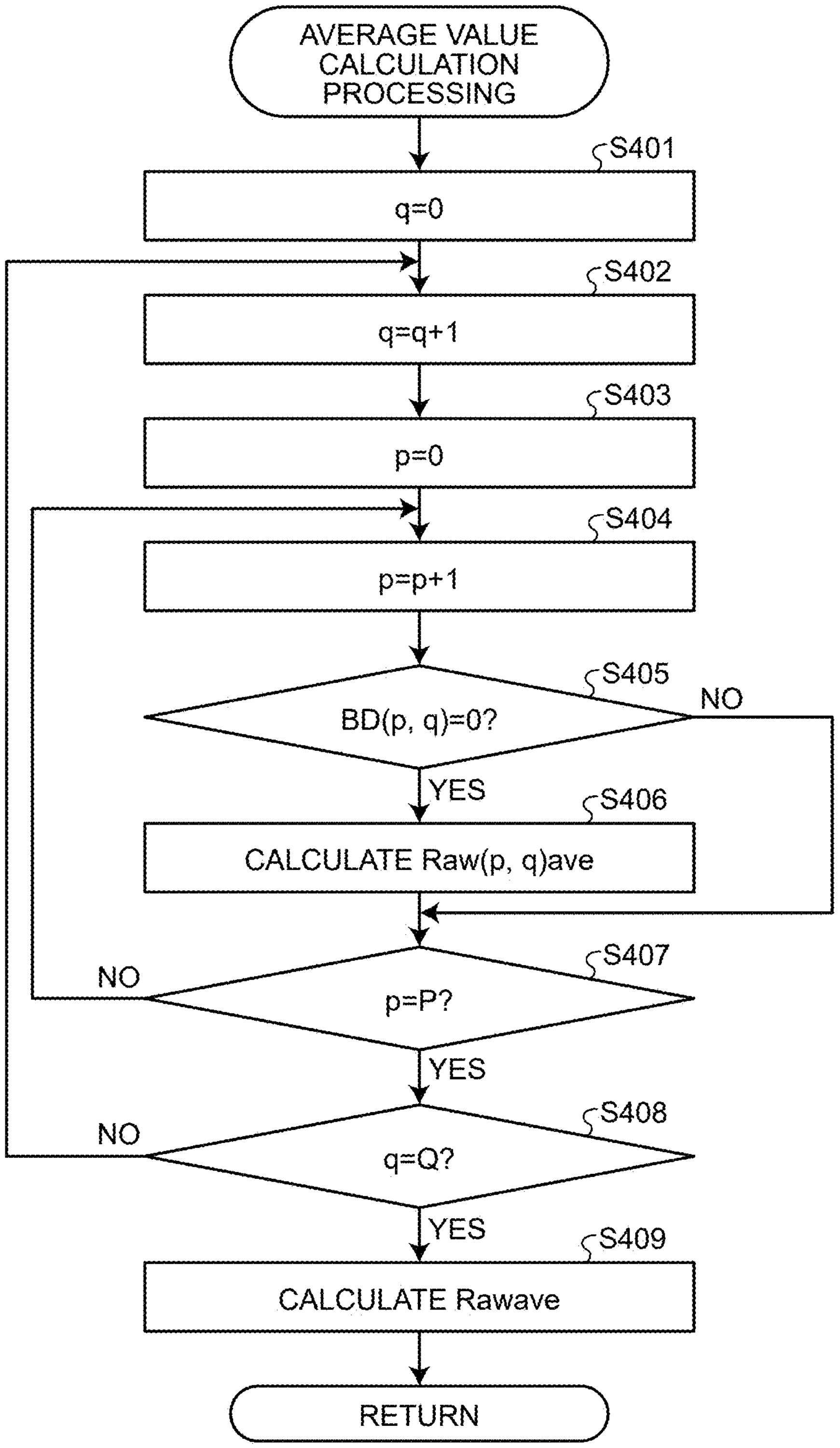
FIG. 14 is a sub-flowchart illustrating an example of an average value calculation processing.

Specifically, in the light emission current setting processing illustrated in FIG. 13, the control circuit 70 controls the optical sensor 10 to acquire the detection values Raw(m, n) for one frame. The data acquisition circuit 71 of the control circuit 70 acquires the detection values Raw(m, n) for one frame output from the detection circuit 11 of the optical sensor 10 (Step S301) and stores them in the storage circuit 72. The processing circuit 73 of the control circuit 70 performs an average value calculation processing illustrated in FIG. 14 (Step S400) to calculate the average value of the detection values Raw(m, n) of photodiodes PD(m, n) in the partial area PAA(p, q) corresponding to the normal light-emitting diodes LED(p, q). FIG. 14 is a sub-flowchart illustrating an example of the average value calculation processing.

Specifically, after the average value calculation processing illustrated in FIG. 14 starts, the processing circuit 73 of the control circuit 70 resets the zone number q (q=0 at Step S401), then, increments the zone number q (q=q+1 at Step S402), furthermore, resets the block number p (p=0 at Step S403), then, increments the block number p (p=p+1 at Step S404), and determines whether the failure detection flag BD (p, q) for the light-emitting diode LED(p, q) is "0" (Step S405).

If the failure detection flag BD (p, q) for the light-emitting diode LED(p, q) is "0" (Yes at Step S405), the light-emitting diode LED(p, q) corresponding to the partial area PAA(p, q) is indicated to be normal. In this case, the processing circuit 73 of the control circuit 70 calculates an average value Raw(p, q) ave of the detection values Raw(m, n) of the photodiodes PD(m, n) in the partial area PAA(p, q) (Step S406), stores the result in the storage circuit 72, and moves to the processing at Step S407.

If the failure detection flag BD (p, q) for the light-emitting diode LED(p, q) is "1" (No at Step S405), the light-emitting diode LED(p, q) corresponding to the partial area PAA(p, q) is indicated to have failed. In this case, the processing circuit 73 of the control circuit 70 does not calculate the average value Raw(p, q) ave, and moves to the processing at Step S407.

The processing circuit 73 of the control circuit 70 then determines whether the block number p is "P" (p=P at Step S407). In other words, the processing circuit 73 of the control circuit 70 determines whether the processing of calculating the average value Raw(p, q) ave of all the partial areas PAA(p, q) corresponding to the normal light-emitting diodes LED(p, q) in the qth zone Zq has been performed. If the processing of calculating the average value Raw(p, q) ave of all the partial areas PAA(p, q) corresponding to the normal light-emitting diodes LED(p, q) in the qth zone Zq has not been performed (No at Step S407), the processing starting at Step S404 is repeated.

If the processing of calculating the average value Raw(p, q) ave of all the partial areas PAA(p, q) corresponding to the normal light-emitting diodes LED(p, q) in the qth zone Zq has been performed (Yes at Step S407), the processing circuit 73 of the control circuit 70 subsequently determines whether the zone number q is "Q" (q=Q at Step S408). In other words, the processing circuit 73 of the control circuit 70 determines whether the processing of calculating the average value Raw(p, q) ave of all the partial areas PAA(p, q) corresponding to the normal light-emitting diodes LED(p, q) in the detection area AA has been performed. If the processing of calculating the average value Raw(p, q) ave of all the partial areas PAA(p, q) corresponding to the normal light-emitting diodes LED(p, q) in the detection area AA has not been performed (No at Step S408), the processing starting at Step S402 is repeated.

If the processing of calculating the average value Raw(p, q) ave of all the partial areas PAA(p, q) corresponding to the normal light-emitting diodes LED(p, q) in the detection area AA has been performed (Yes at Step S408), the processing circuit 73 of the control circuit 70 reads out the average value Raw(p, q) ave and the value of the normal LED counter NDC stored in the storage circuit 72, and calculates the average value Rawave of all the partial areas PAA(p, q) corresponding to the normal light-emitting diodes LED(p, q) using Expression (1) below (Step S409), and the process returns to the light emission current setting processing illustrated in FIG. 13.

$$Rawave = \left(\sum \mathrm{Raw}\,(p,\,q)\,ave\right)/NDC \tag{1}$$

After returning to the light emission current setting processing illustrated in FIG. 13, the processing circuit 73 of the control circuit 70 determines whether the average value Rawave calculated in the average value calculation processing illustrated in FIG. 14 is equal to or higher than the target lower limit value Rawth1 (Step S302).

If the average value Rawave is lower than the target lower limit value Rawth1 (Rawave<Rawth1, No at Step S302), the processing circuit 73 of the control circuit 70 increases the cathode current set value ISV by one step (ISV=ISV+1 at Step S303), then returns to the processing at Step S301, and performs the processing starting at Step S301.

If the average value Rawave is equal to or higher than the target lower limit value Rawth1 (Rawave≥Rawth1, Yes at Step S302), the processing circuit 73 of the control circuit 70 subsequently determines whether the average value Rawave is equal to or lower than the target upper limit value Rawth2 (Step S304).

If the average value Rawave is higher than the target upper limit value Rawth2 (Rawave>Rawth2, No at Step S304), the processing circuit 73 of the control circuit 70 reduces the cathode current set value ISV by one step (ISV=ISV−1 at Step S305), then returns to the processing at Step S301, and performs the processing starting at Step S301.

If the average value Rawave is equal to or lower than the target upper limit value Rawth2 (Rawave≤Rawth2, Yes at Step S304), the process returns to the processing in FIG. 10, and the initial setting processing ends.

The initial setting process of the detection device 1 according to the embodiment described above makes the initial setting of the light emission current ICS that flows to each of the light-emitting diodes LED(p, q) so that the average value Rawave of the detection values Raw(m, n) of the photodiodes PD(m, n) in the partial area PAA(p, q) corresponding to the normal light-emitting diodes LED(p, q) falls within the target range (Rawth1≤Rawave≤Rawth2). As a result, the detection values Raw(m, n) of the photodiodes PD(m, n) in the partial area PAA(p, q) corresponding to the normal light-emitting diodes LED(p, q) are restrained from becoming relatively larger after the initial setting.

While the preferred embodiment of the present disclosure has been described above, the present disclosure is not limited to the embodiment described above. The content disclosed in the embodiment is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiment described above.

What is claimed is:

1. A detection device comprising:

an optical sensor having a detection area in which a plurality of sensor pixels are arranged in a planar configuration;

a light source in which a plurality of light-emitting diodes are arranged in a plane parallel to the detection area; and a control circuit configured to control the optical sensor and the light source, acquire detection values of the sensor pixels, and generate an image of an object to be detected placed in the detection area, wherein each of the sensor pixels is associated with a nearest light-emitting diode of the light-emitting diodes, and the control circuit is configured to acquire detection values of the sensor pixels when the object to be detected is not placed in the detection area, and uniformly set current set values of the light-emitting diodes so that an average value of the detection values of the sensor pixels associated with the light-emitting diodes that are not failed falls within a target range.

2. The detection device according to claim 1, wherein each of the light-emitting diodes is associated with more than one of the sensor pixels.

3. The detection device according to claim 2, wherein the sensor pixels are arranged in a matrix having a row-column configuration in a first direction and a second direction intersecting with the first direction, and among the sensor pixels, the sensor pixels arranged in the first direction are coupled to the same scan line and the sensor pixels arranged in the second direction are configured to be sequentially driven.

4. The detection device according to claim 3, wherein the light-emitting diodes are arranged in a matrix having a row-column configuration in the first direction and the second direction, and among the light-emitting diodes, the light-emitting diodes arranged in the first direction are coupled to the same scan line and the light-emitting diodes arranged in the second direction are configured to be sequentially driven.

5. The detection device according to claim 4, wherein the sensor pixels arranged in the second direction in an area including the sensor pixels associated with the light-emitting diodes arranged in the first direction are configured to be sequentially driven during a drive period of the light-emitting diodes arranged in the first direction.

* * * * *